Aug. 26, 1969    W. E. WHITE ET AL    3,463,605
PROCESS AND APPARATUS FOR PRODUCTION OF ALKALI
METAL MONOFLUOROPHOSPHATE
Filed June 13, 1966

INVENTORS.
WAYNE E. WHITE
JOE E. GILLILAND
JAMES M. MUNN
BENNY B. WRIGHT

BY

ATTORNEY

3,463,605
PROCESS AND APPARATUS FOR PRODUCTION OF ALKALI METAL MONOFLUOROPHOSPHATE

Wayne E. White and James M. Munn, Sand Springs, and Joe E. Gilliland and Benny B. Wright, Tulsa, Okla., assignors to Ozark-Mahoning Company, Tulsa, Okla., a corporation of Delaware
Filed June 13, 1966, Ser. No. 557,239
Int. Cl. C01b 25/30; C01d 11/00; B01j 1/20
U.S. Cl. 23—50                                    2 Claims

ABSTRACT OF THE DISCLOSURE

A process and apparatus for the continuous production of sodium monofluorophosphate by reacting sodium fluoride and sodium metaphosphate is disclosed. The finely divided reactant mixture is passed through a graphite lined reactor wherein the temperature is sufficiently high to melt the mixture; the flow of the mixture is controlled such that a blanket thereof is maintained above the molten mass to protect it from atmospheric moisture and confine the generated reaction vapors. Molten product is continuously withdrawn and quickly cooled by flowing large volumes of air thereover.

---

This invention relates to the production of alkali metal monofluorophosphates. More particularly, this invention relates to a method and apparatus for the continuous production of sodium monofluorophosphate.

The laboratory production of sodium monofluorophosphate was described in U.S. 2,481,807 by Anderson, which patent was assigned to the assignee of the present invention. As pointed out in that patent, commercial production of this material had not been previously accomplished, presumably because of the characteristics of the reactants and the precautions that needed to be taken during the preparation.

Thus, the laboratory preparations described in U.S. 2,481,807 were all made in platinum vessels, although it is known that silver vessels are somewhat resistant to the fusion products of the reaction. Another factor recognized by Anderson in 2,481,807 which tended to prevent continuous commercial production of the material was the fact that the reaction had to be accomplished in the absence of atmospheric moisture or moist air during the heating to fusion and subsequent cooling. The requirement for the use of platinum reaction vessels would make the development of a commercial process unfeasible, particularly where the commercial process would have to be a "batch" process, because of the great expense involved in utilizing vessels of sufficient size. Silver vessels are only partially resistant to the conditions of this reaction, and here again the expense of utilizing silver vessels of sufficient size is prohibitive.

Another of the many disadvantages to be overcome before a successful continuous process for the production of sodium monofluorophosphate could be developed is that the reacting materials had to be protected from atmospheric moisture. This seemed to necessitate a batch process where the fusion reaction could be carried out and the product cooled in the same reacting vessel. Once cooled, the product is reasonably stable upon exposure to the atmosphere.

An object of this invention is to provide a process for the preparation of sodium monofluorophosphate which may be conducted in a continuous manner.

Another object of this invention is to provide for the continuous production of sodium monofluorophosphate utilizing equipment which is resistant to the reactants and products and which equipment is inexpensive to construct and maintain.

Still another object of this invention is to provide a continuous process for the production of sodium monofluorophosphate in which the molten product is permitted to be exposed to the atmosphere during cooling.

Sodium monofluorophosphate has been found useful in dental preparations, in dentifrices as a caries preventative, and in solutions as a caries preventative and tooth desensitizer. Sodium monofluorophosphate has also been used as a mold inhibitor.

The continuous production of sodium monofluorophosphate in commercial quantities is now possible because we have discovered that reactors made of graphite are able to withstand the temperature of the reaction and to withstand the effects of molten reacting material and the vapors of the reaction. Furthermore, we have found that we can produce sodium monofluorophosphate in a continuous process by employing graphite reactors of unique design in which the reaction may be carried out efficiently. The reactor of the invention has been designed to withstand the high temperatures at which the reaction is carried out, the destructive vapors generated during the reaction, and the corrosive properties of the molten material, while at the same time the design is such that the vapors are maintained in the reaction zone to insure a product of high quality, and while a continuous stream of molten product is withdrawn from the reactor. The continuous process described in this invention which permits large scale commercial production of sodium monofluorophosphate is based on the reaction of sodium fluoride and sodium metaphosphate at fusion temperature in which stoichiometric amounts of the reaction materials are intimately mixed and fed into the reaction zone and there subjected to a temperature sufficiently high to form a molten mass of a major portion of the mixture. Although any of the sodium metaphosphates may be used in this process, we prefer that material known as insoluble sodium metaphosphate, and described in the trade as sodium metaphosphate (IMP). This is a high molecular weight long chain polymer thought to have a corkscrew configuration as contrasted to the circular configuration of sodium trimetaphosphate. The molten product in the reaction zone is partially protected from the atmosphere by a superimposed layer of the mixed reactants being fed into the reaction zone, which superimposed layer serves to confine to the reaction zone vapors generated during the reaction. The rate of flow of the reacting materials into the reactor and the rate of withdrawal of molten product are preferably controlled so that a blanket of the intimate mixture of reactants is maintained above the molten mass.

We have now discovered that we can provide a product of essentially 100 percent purity without the necessity of conducting our process completely within a sealed vessel. Our process further provides for the removal of molten products from the reaction zone into suitable receiving containers without protecting the liquid stream from the atmosphere. We have provided means for rapidly cooling the stream of withdrawal products by flowing large volumes of air over the molten stream and the collected product. One explanation that has been offered for the efficiency of this operation which is contrary to previous teachings, is that a moisture resistant crust or outer layer is formed which helps protect the underlying molten product from atmospheric moisture in the presence of which the molten product is subject to degradation.

Further objects and advantages of the invention will become apparent from the following description and claims, and from the accompanying drawings wherein:

Figure 1:
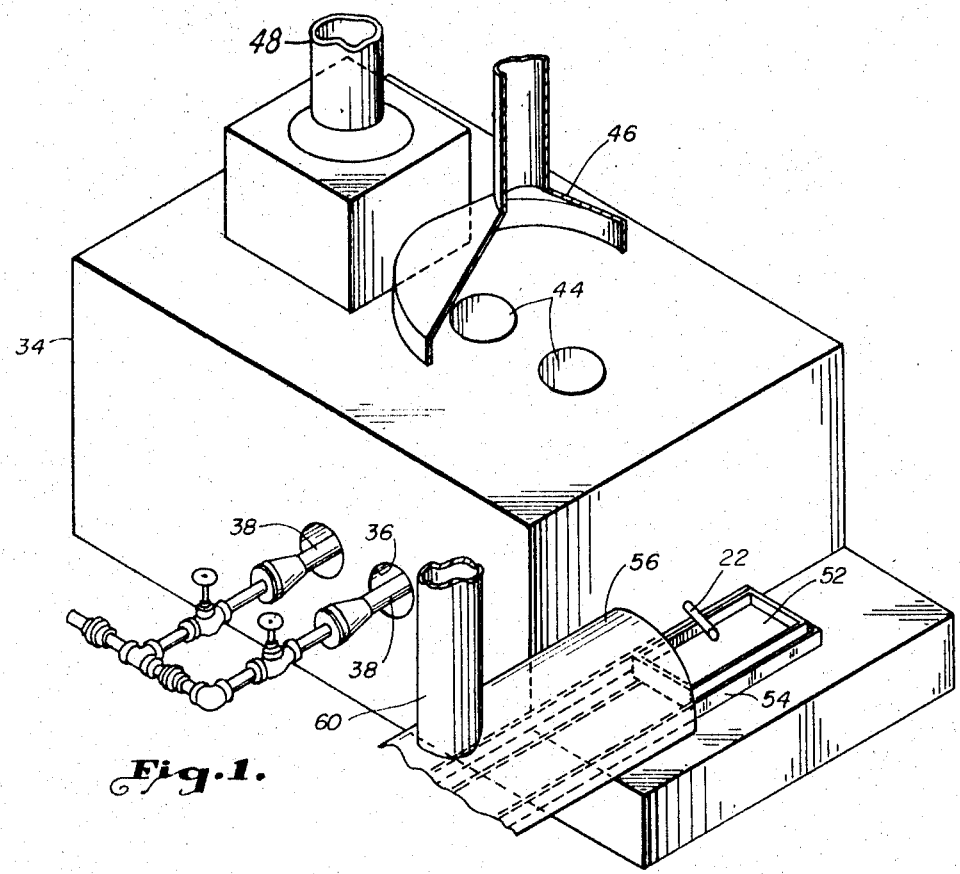
FIGURE 1 is a perspective view of a reactor prepared according to this invention.
Figure 2:
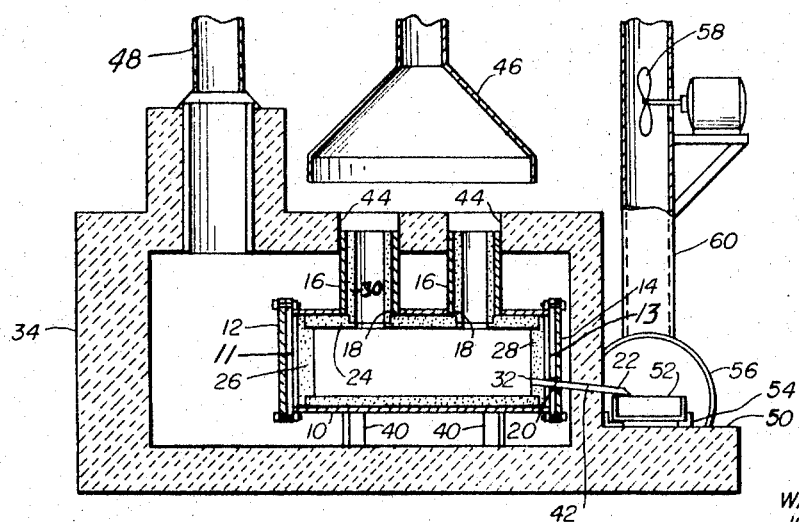
FIGURE 2 is a cross-sectional view of the reactor of FIGURE 1.

Referring now to the drawings in detail, one form of reactor prepared according to this invention comprises a unitary tubular body portion 10 formed of heat resistant metal having a first flange 11 circumferentially adjacent one end of the body and to which a first end plate 12 is bolted by conventional means, a second flange 13 circumferentially adjacent a second end of the body and to which a second end plate 14 is bolted, and upwardly extending filling conduits 16, said body portion having a tubular section 10, a first end plate 12 and a second end plate 14, and upwardly extending filling conduits 16. Filling conduits 16 communicate with inlets 18, and an outlet 20 receives a silver discharge conduit 22. A preferred metal for the construction of the body portion of the reactor is Inconel 600, the trademark of a heat resistant metal of International Nickel Company. Preferably, the body portion of the reactor should be somewhat resistant to the reaction of fluorides, but an inertness to fluorides such as that exemplified by platinum, is not necessary since the body portion will not be exposed to a heavy concentration of molten fluoride or to fluoride vapors. Interiorly of the body portion of the reactor is a graphite liner comprising a tubular portion 24, a first end portion 26, a second end portion 28, and filling conduit liners 30. The graphite liner members comprise an interior structure which conforms substantially to the configuration of the metallic body portion and serves as the retort in which the fusion reaction takes place, thus protecting the metallic shell from the action of the fluorides. End portion 28 includes an outlet 32 communicating with outlet 20 and adapted to receive silver discharge conduit 22 so that conduit 22 will communicate with the interior of the graphite liner. Outlet 32 in the graphite liner is preferably constructed with threads into which the silver discharge conduit having matching threads may be screwed to provide a stable structure and permit easy replacement of the silver conduit when necessary. Although silver is generally considered resistant to molten fluorides, it has been our experience that the combination of molten fluorides at a temperature of this reaction causes the silver to crystallize, become brittle and break. Therefore, we prefer an arrangement whereby the silver spout may be easily replaced. Our preferred structure for the graphite liner is that end portions 26 and 28 and filling conduit liners 30 are securely held in place by a high temperature cement such as is obtainable from the National Carbon Company.

In one embodiment of the reactor of this invention we have positioned the reactor within a furnace 34 suitable of design and which furnace is intended to act as a means for controlling and conserving the heat necessary to perform the fusion operation. In the figures we show the furnace 34 as being of fire brick and as surrounding the reactor and having inlets 36 through which gas burners 38 are inserted. Other means of providing heat for the fusion may be provided instead of gas burners 38. Interiorly of furnace 34 are supports 40 to permit positioning of gas burners 38 underneath the reactor for most efficient heating. At one end of furnace 34 is an outlet 42 through which discharge conduit 22 passes. On an upper side of furnace 34 we have provided inlets 44 which communicate with filling conduits 16 and which permit the loading of the reactor with the intimate mixture of reactants. Positioned directly above inlets 44 is fume hood 46 to draw off any fumes emanating from the interior of the reactor which might penetrate the blanket of powdered reactants within conduit liners 30. The thickness of the superimposed blanket will of course depend upon the progress of the fusion reaction, that is, initially all the reacting material will be in powder form and as the fusion proceeds the thickness of the blanket within the reactor will decrease and powdered material may be maintained to a chosen level within liner 30. Furnace 34 also includes exhaust stack 48 to permit the removal of combustion products. In this embodiment of our invention we have provided a shelf portion 50 at the front of the furnace to support a receiving tray 52 of appropriate size which is positioned on guide rail 54 beneath discharge conduit 22 to receive molten product from the reactor. Tray 52 upon being filled is drawn into tunnel 56 to be exposed thereto to a forced flow of air drawn through tunnel 56 by a motor driven fan 58 positioned in duct 60.

Although we prefer a tray type receiving means, we do not intend that this be the only receiving means operable with our invention since other means for receiving the molten stream and cooling the molten product are usable. For example, a revolving drum which is interiorly water-cooled and includes an exterior circumferential receiving channel is applicable in a manner that the molten product impinges on the exterior channel portion and is quickly cooled. As the receiving channel rotates in its vertical plane the quickly-dried product is recovered from the receiving channel and a subsequent cooling portion of the channel is exposed to the molten stream. Another means of receiving molten product is by the use of a prilling tower which receives the molten stream in a perforated top portion and permits the stream to drop in a stream of droplets to the bottom where it is collected as a dried product.

EXAMPLE

A production run was made according to the continuous process of our invention by intimately mixing 1.3764 parts of sodium fluoride and 3.3424 parts insoluble sodium metaphosphate (IMP) in the proper blending and mixing apparatus and feeding the intimate mixture to the reactor through inlet 44 and liner 30 and maintaining the reactor at a temperature of above 660° C. After the reactor and initial charge was brought to a temperature of 660° C., the residence time of the intimate mixture and molten product is determined only by the time required for the mixture to reach the molten state. Once fusion is obtained there is no need for the molten material to remain in the reactor. As described above, the superimposed blanket of the intimate mixture was maintained above the molten material within the reactor throughout the process. Thus, the intimate mixture was added to the reactor and molten product of substantially pure grade was withdrawn through discharge tube 22. The molten product was collected in a receiving tray 52 and quickly cooled to a dry mass. After cooling the dry pure product was ground to a specified mesh size. The results of the analysis of representative samples of this material are shown below, each analytical result being that of a representative sample of subsequent 1000 lb. portions prepared from continuous operation.

| Sample: | Percent $Na_2PO_3F$ |
| --- | --- |
| 1 | 99.32 |
| 2 | 99.54 |
| 3 | 99.39 |
| 4 | 99.39 |
| 5 | 99.32 |
| 6 | 98.79 |

Potassium monofluorophosphate and lithium monofluorophosphate have been prepared in the laboratory by small scale batch processes in a manner similar to that used in the preparation of sodium monofluorophosphate. For example, potassium monofluorophosphate has been prepared from the fusion of potassium fluoride and potassium metaphosphate. Lithium monofluorophosphate has been prepared by the reaction of lithium fluoride and lithium metaphosphate. These reactions are sufficiently similar to that of sodium fluoride with sodium metaphosphate to indicate that potassium monofluorophosphate and lithium monofluorophosphate could be prepared by the continuous process of this invention.

What is claimed:

1. A continuous process for the commercial production of sodium monofluorophosphate comprising:
   premixing stoichiometric amounts of finely divided sodium fluoride and finely divided sodium metaphosphate to form an intimate mixture;

passing said intimate mixture through a heated reaction zone of a graphite lined reactor;

maintaining said reaction zone at a temperature sufficiently high to form a molten mass of a major portion of said intimate mixture;

controlling the flow of said intimate mixture into said reaction zone and the flow of said molten mass from said reaction zone at a rate such that a blanket of said intimate mixture is maintained above said molten mass to substantially protect said mass from atmospheric moisture and confine reaction vapors generated;

continuously withdrawing a stream of molten product from said reactor; and quickly cooling said molten product by flowing large volumes of air over said molten stream.

2. A continuous process for the commercial production of sodium monofluorophosphate as described in claim 1 wherein:

said sodium metaphosphate is of the form known as insoluble sodium metaphosphate.

References Cited

UNITED STATES PATENTS

| 2,481,807 | 9/1949 | Anderson | 23—50 |
| 2,967,759 | 1/1961 | Wainer. | |
| 3,230,042 | 1/1966 | Heinze et al. | 23—145 |

HERBERT T. CARTER, Primary Examiner

U.S. Cl. X.R.

23—285